US011908652B2

(12) United States Patent
Beyer et al.

(10) Patent No.: US 11,908,652 B2
(45) Date of Patent: Feb. 20, 2024

(54) SIGNALING DEVICE, AN ELECTRICAL FUSE APPARATUS AND A DEVICE COMPRISING THE ELECTRICAL FUSE APPARATUS

(71) Applicant: SCHURTER AG, Lucerne (CH)

(72) Inventors: Christian Beyer, Olten (CH); Rolf Nussbaumer, Cham (CH); Bruno Zemp, Lucerne (CH); Thomas Burch, Wilen (CH); Stephan Bitterli, Alpnach Dorf (CH); Markus Beer, Rotkreuz (CH); Cyrill Disler, Kriens (CH)

(73) Assignee: SCHURTER AG, Lucerne (CH)

( * ) Notice: Subject to any disclaimer, the term of this patent is extended or adjusted under 35 U.S.C. 154(b) by 247 days.

(21) Appl. No.: 17/432,463

(22) PCT Filed: Feb. 19, 2019

(86) PCT No.: PCT/EP2019/054054
§ 371 (c)(1),
(2) Date: Aug. 19, 2021

(87) PCT Pub. No.: WO2020/169180
PCT Pub. Date: Aug. 27, 2020

(65) Prior Publication Data
US 2022/0139658 A1 May 5, 2022

(51) Int. Cl.
*H01H 85/30* (2006.01)
*H01H 85/20* (2006.01)

(52) U.S. Cl.
CPC ............ *H01H 85/30* (2013.01); *H01H 85/20* (2013.01)

(58) Field of Classification Search
CPC .......................... H01H 85/20; H01H 85/30–34
See application file for complete search history.

(56) References Cited

U.S. PATENT DOCUMENTS 4,489,300 A * 12/1984 Hollenstein .......... H01H 9/0011 337/186
4,685,028 A * 8/1987 Miller ...................... H02B 1/18 337/8
6,183,101 B1 * 2/2001 Chien .................. H01R 13/025 362/84
6,448,897 B1 * 9/2002 Ku ......................... H01H 85/32 324/507

(Continued)

FOREIGN PATENT DOCUMENTS

DE 20001323 U1 3/2000
DE 202008011393 U1 10/2008

(Continued)

OTHER PUBLICATIONS

International Search Report and Written Opinion in PCT/EP2019/054054 dated Sep. 18, 2019, 12 pages.

*Primary Examiner* — Jacob R Crum
(74) *Attorney, Agent, or Firm* — ROTHWELL, FIGG, ERNST & MANBECK, P.C.

(57) ABSTRACT

A signaling device adapted to be electrically coupled to an electric potential applied to terminals of a fuse element or to clips of a fuse holder. The signaling device is adapted to signal to the outside at least one property of the fuse element. In addition, the signaling device includes at least one transmission layer having an electrically controllable transmission factor.

16 Claims, 4 Drawing Sheets

(56) References Cited

U.S. PATENT DOCUMENTS

| | | | | |
|---|---|---|---|---|
| 2008/0129441 | A1* | 6/2008 | Darr | H01H 85/30 337/206 |
| 2010/0019913 | A1* | 1/2010 | Rodseth | H02H 3/046 340/638 |
| 2010/0328019 | A1 | 12/2010 | Darr et al. | |

FOREIGN PATENT DOCUMENTS

| | | | |
|---|---|---|---|
| DE | 102016110286 | A1 | 12/2017 |
| JP | 3069664 | U | 6/2000 |
| JP | 3075125 | U | 2/2001 |

* cited by examiner

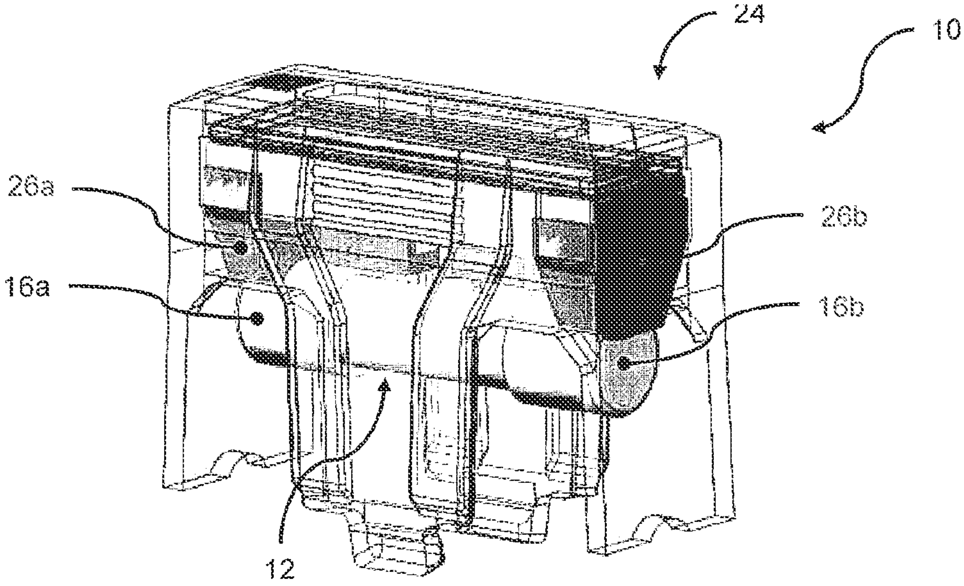
Fig. 1
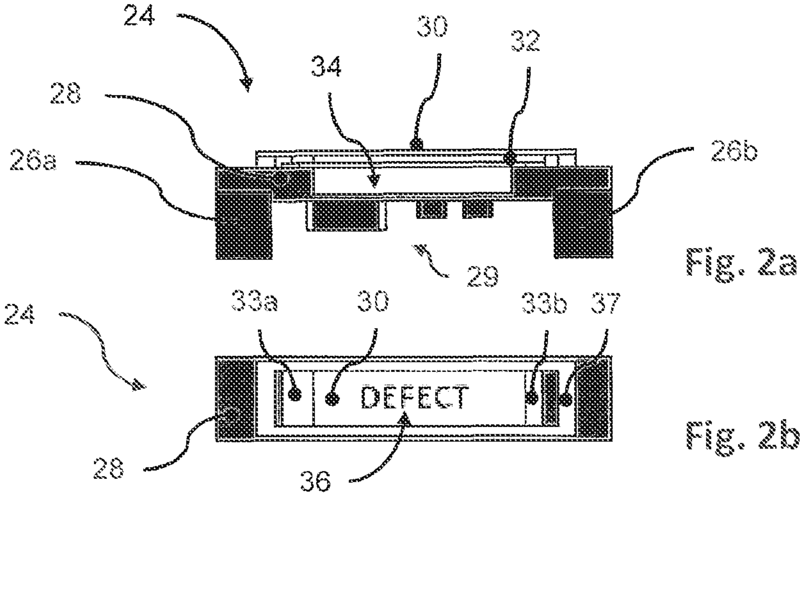
Fig. 2a
Fig. 2b

SIGNALING DEVICE, AN ELECTRICAL FUSE APPARATUS AND A DEVICE COMPRISING THE ELECTRICAL FUSE APPARATUS

CROSS REFERENCE TO RELATED APPLICATIONS

This application is a 35 U.S.C. 371 National Phase Entry Application from PCT/EP2019/054054, filed Feb. 19, 2019, the disclosures of which is incorporated herein in its entirety by reference, and priority is claimed to the foregoing.

TECHNICAL FIELD

The present invention is related to a signaling device, an electrical fuse apparatus comprising the signaling device, and a device comprising the electrical fuse apparatus.

BACKGROUND OF THE INVENTION

Electrical devices comprising at least one electrical fuse apparatus are known. In an example, an electrical fuse apparatus can comprise a fuse element having a cylindrical body provided with electrical terminals at respective ends thereof. A fuse wire can extend inside the cylindrical body while ends of the fuse wire are electrically connected to the electrical terminals. The fuse element can be supported via its terminals by means of electrical connectors comprised by the electrical fuse apparatus. The electrical connectors are further adapted to supply the fuse element with a current flowing through the fuse wire. In a proper operational condition of the electrical device, the current flows through the fuse wire for supplying at least one electronic component with current, also referred as a conductive state. A faulty condition of the electrical device or rather of at least one of its electronic components, e.g. a power transistor, can result in an over-current flowing through the fuse element, which over-current is melting or blowing the fuse wire, also referred as blocking state of the fuse element. The melting of the fuse wire immediately blocks the current from flowing, resulting in e.g. the faulty electronic component being powered down to thus protect the overall electrical device. After having overcome the faulty condition, the blown fuse element can be substituted for a new fuse element.

In the state of the art, especially in an electrical device comprising a plurality of fuse elements, recognizing or rather locating the blown fuse element, e.g. in order to substitute it for a new fuse element, has been proved to be cumbersome and time-consuming.

It is therefore an object of the present invention to provide a signaling device for an electrical fuse apparatus, an electrical fuse apparatus, and a device comprising the electrical fuse apparatus which overcome the problems known in the art. Further embodiments are defined in dependent claims.

SUMMARY OF THE INVENTION

The present invention is directed to a signaling device adapted to be electrically coupled to an electric potential applied to terminals of a fuse element or to clips of a fuse holder, said signaling device is adapted to signal to the outside at least one property of said fuse element, wherein said signaling device comprises at least one transmission layer having an electrically controllable transmission factor.

Hence, provided is a signaling device which can be part of an electrical fuse apparatus, which further comprises at least one fuse element. The signaling device can be coupled to clips of a fuse holder, which can be comprised by the electrical fuse apparatus or to terminals of the fuse element, which terminals can be provided to ends of the fuse element. In doing so, an electric potential applied to the terminals of the fuse element is applied to the signaling device, too. Said signaling device comprises a transmission layer, wherein said transmission layer has an electrically controllable transmission factor. The transmission factor can be varied in a range between opaque and transparent which becomes visible to the outside. In an example, a region disposed behind the transmission layer becomes more or less visible to the outside. Therefore, a respective property of the fuse element, i.e. a conducting state (the fuse is not blown) or blocking state (the fuse is blown), becomes visible to e.g. a user or operator of the electric device. Hence, a blown fuse element can be recognized by the operator easily.

In an embodiment the signaling device further comprises leads adapted to connect the transmission layer and the fuse element in parallel. Hence, the electric potential applied to the ends or rather terminals of the fuse element is also applied to the transmission layer. Therefore, the transmission layer is able to change its transmission factor in relation to the electric field applied to the fuse element.

In an embodiment of the signaling device the leads comprise conductive rubber leads adapted to provide an electrical connection between terminals of the transmission layer and the terminals of the fuse element or between terminals of the transmission layer and the clips of the fuse holder, respectively. The conductive rubber leads reliably provide an electrical connection between terminals of the fuse element and terminals of the signaling layer, respectively. Due to the elasticity of the conductive rubber leads, the transmission layer can be smoothly pushed in the direction to the terminals of the fuse element, thus achieving a reliable connection. Further, occurrence of any gaps can be avoided.

In an embodiment of the signaling device the transmission layer is adapted to control its transmission factor in relation to an electric potential applied to terminals thereof. In case of the applied electric field is below a predetermined threshold, the transmission factor is low or rather negligible, resulting in the transmission layer is opaque. It is to be noted that the electric field is negligible or rather below the predetermined threshold in case of the fuse element is in a conductive state or rather not blown. The reason for this is that the resistance of the (not blown) fuse wire can be neglected. In other words, the transmission layer is opaque if the fuse element is in its conductive state. This in turn results in a region or element disposed behind the transmission layer is not visible to the outside.

On the other hand, once the fuse element is blown, the electric field rises such to exceed the predetermined threshold. The rising of the electric potential above the predetermined threshold results in the transmission layer becomes transparent. In other words, the transmission layer becomes transparent immediately after the fuse element is blown. This in turn results in a region or element disposed behind the transmission layer becomes visible from the outside. Therefore, the operator is able to recognize the blown fuse element easily. Hence, the operator can substitute the blown fuse element for a new fuse element, if necessary.

In an embodiment of the signaling device said transmission layer comprises liquid crystals adapted to be aligned in an electric field. In a further embodiment of the signaling device said transmission layer comprises a Polymere-Dispersed Liquid Crystal, PDLC, layer. A PDLC based glass, also referred as smart glass, is a glass whose transmission factor or rather light transmission property can be altered if a voltage is applied. Generally, the glass changes between opaque to transparent, changing from blocking some (or all) wavelengths of light and letting light pass through.

In an embodiment the signaling device further comprises a signaling layer arranged behind the transmission layer if viewed from the outside. In other words, the transmission layer is arranged between the signaling layer and the outside. This arrangement allows to control visibility of the signaling layer by just controlling the transmission factor of the transmission layer. In other words, if the transmission layer is opaque, the signaling layer is concealed or simply not visible from outside. On the other hand, if the transmission layer is transparent, the signaling layer becomes visible to the outside.

In an embodiment of the signaling device the signaling layer comprises an information element adapted to signal to the outside the at least one property of the fuse element. In a further embodiment said information element is labeled and/or printed onto a surface of the signaling layer facing the transmission layer. In a further embodiment said information element comprises at least one of color(s), sign(s), letter(s), wording(s), and number(s). The signaling layer can be labeled or printed with any indication which is able to attract user's or operator's attention. In an example, the signaling layer can be printed or labeled in a noticeable color, e.g. red color, which color achieves an improved attraction even in low light conditions. In a further example, the signaling layer can be printed with a wording indicating the fuse element condition or rather property, e.g. the wording "Defect". Therefore, recognizing a blown fuse element or rather a defect condition can even be achieved by untrained personnel.

In an embodiment of the signaling device the property of the fuse element comprises at least one of a conductive state or blocking state of said fuse element, a voltage, a current, and a temperature. The signaling device can indicate the property of the comprised fuse element, i.e. blown or not blown, as indicated above. Furthermore, additionally or as an option, the signaling device can indicate one or more further conditions, comprising e.g. the applied voltage, a current flowing through the fuse element, a temperature of the signaling device or in a region adjacent thereof, etc.

In an embodiment of the signaling device the transmission factor of the transmission layer is controlled in a range between opaque and transparent. In this embodiment, next to the ability to indicate two conditions, e.g. whether the fuse element is blown or not, the signaling device is able to present graduated or rather stepped indications, e.g. an information allowing to indicate how much current is flowing through the fuse element, a voltage applied, a temperature, etc.

In an embodiment the signaling device is adapted to control the transmission factor of the transmission layer such to be transparent in case of the fuse element is in a blocking state, or to be opaque in case of the fuse element is in a conductive state.

The present invention also relates to an electrical fuse apparatus comprising a fuse element, a base for supporting the fuse element, and a signaling device according to one of claims 1 to 13, wherein said signaling device is electrically coupled to an electric potential applied to the fuse element.

Moreover, the present invention is directed to a device comprising at least one electrical component and an electrical fuse apparatus according to claim 14, said electrical fuse apparatus is adapted to protect the electrical component against over-current. Hence, provided is a device which electrical component(s) can be protected at least against over-current by means of the electrical fuse apparatus, wherein said electrical fuse apparatus is further adapted to signal to the outside at least one property of the fuse element comprised by said electrical fuse apparatus.

Moreover, the present invention is directed to a power entry module adapted to supply an electrical appliance with power, said power entry module comprising the electrical fuse apparatus according to claim 14.

It is expressly pointed out that any combination of the above-mentioned embodiments is subject of further possible embodiments. Only those embodiments are excluded that would result in a contradiction.

BRIEF DESCRIPTION OF THE DRAWINGS

The present invention is further described with reference to the accompanying drawings jointly illustrating various exemplary embodiments which are to be considered in connection with the following detailed description. What is shown in the figures is:

FIG. 1 an embodiment of an electrical fuse apparatus with signaling device in a semi-transparent view;

FIGS. 2*a,b* schematically depict a signaling device in a side view and a top view, respectively;

DETAILED DESCRIPTION OF THE INVENTION

Figure 3A:
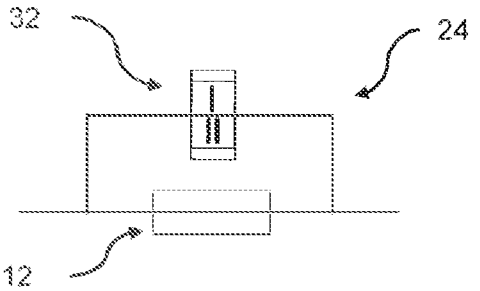
FIGS. 3*a-e* schematically depict exemplary signaling device circuits.

FIG. 1 shows an electrical fuse apparatus 10 in a semi-transparent view. The electrical fuse apparatus 10 comprises a replaceable fuse element 12, which can be supported by a fuse holder (not shown) comprising e.g. two fuse clips, each made of an electric conductive material. In the shown embodiment, the fuse element 12 is a cartridge fuse 12. The fuse clips can be adapted to, while supporting the cartridge fuse 12, provide an electrical connection between terminals 16*a,b* of the cartridge fuse 12 and solder pins (not shown), which can be comprised by the fuse clips, which solder pins can be electrically connected to e.g. conductive paths or pads comprised by a printed circuit board PCB (not shown) by means of e.g. soldering.

The electrical fuse apparatus 10 further comprises a signaling device 24 which, in the shown example, is disposed above the cartridge fuse 12 once inserted into the electrical fuse apparatus 10. The signaling device 24 can comprise terminals electrically connected to the terminals 16*a,b* of the cartridge fuse 12 or direct to the fuse clips by means of two conductive rubber leads 26*a,b*.

An exemplary signaling device 24 is schematically depicted in FIGS. 2*a* and 2*b* in a side view and a top view, respectively. A substrate 28 is configured for supporting components of the signaling device 24. The substrate 28 can be comprised of a printed circuit board PCB, conductive polymere, glass or ceramic substrate. The substrate 28 can be equipped with electrical components 29, e.g. SMD-components. The signaling device 24 comprises a top glass 30 to be further described in the following. The signaling device 24 further comprises a transmission layer 32 having an electrically controllable transmission factor. The transmission layer 32 can be controlled such to be opaque or transparent, wherein gradients or rather steps in the range between opaque and transparent are achievable. The substrate 28 can also support further electronic components of the signaling device 24, connected by means of e.g. electric paths comprised by the substrate 28.

In an example, the transmission layer 32 comprises liquid crystals adapted to be aligned in an electric field. In an example, the transmission layer 32 is a Polymere Dispersed Liquid Crystal, PDLC, layer, also referred as smart glass. Opposing ends of the substrate 28, as viewed in longitudinal extension thereof, are provided with electrical terminals, which are connected to the terminals 16*a,b* of the cartridge fuse (refer to FIG. 1) by means of the conductive rubber leads 26*a,b*. Due to its elasticity, the conductive rubber leads 26*a,b* provide reliable electrical connections between the terminals of the substrate 28 and the terminals 16*a,b* of the cartridge fuse or clips of the fuse holder, respectively. The electrical terminals of the substrate 28 are in turn electrically coupled to respective electrical terminals 33*a*,33*b* of the transmission layer 32. Said electrical terminals 33*a*,33*b* of the transmission layer 32 are connected to respective pads (not shown) arranged on the substrate 28 by means of e.g. conductive glue, solder bonding or diffusion bonding. Hence, in operation, the transmission layer 32 and the cartridge fuse are applied by essentially the same electric potential. Therefore, the transmission factor of the transmission layer 32 can be controlled in relation to the electric potential applied to the terminals 16*a,b* of the cartridge fuse.

Assumed that the cartridge fuse is in a conductive state or rather not blown, the electric field applied to the terminals 16*a,b* thereof is very low or rather negligible. The reason for this is that the electric resistance of the fuse wire can be neglected, resulting in an electric potential of almost zero. Therefore, the electrical potential applied to the transmission layer 32 is negligible, too, resulting in the transmission layer 32 is opaque. The transmission layer 32 remains opaque as long as the cartridge fuse is in its conductive state (not blown).

On the other hand, assumed that the cartridge fuse is blown, the electric potential applied to the terminals 16*a,b* of the cartridge fuse increases rapidly. Since the increased electric potential is also applied to the transmission layer 32, the transmission layer 32 becomes transparent or rather shifts from opaque to transparent. In other words, the transmission layer 32 becomes transparent immediately after the cartridge fuse is blown. This in turn results in a signaling layer 34 arranged beneath the transmission layer 32 becomes visible from the outside. Therefore, the operator is able to recognize that the cartridge fuse is blown, which allows him e.g. to identify the reason(s) thereof and afterwards substitute the blown cartridge fuse by a new cartridge fuse, if necessary.

The signaling layer 34 can comprise an information element 36 adapted to signal to the outside the at least one property of the cartridge fuse 12. The information element 36 can be labeled or printed onto the surface of the signaling layer 34, which is >=3 mm below the transmission layer 32. In the example shown in FIG. 2*b*, the information element 36 is a wording "DEFECT". Next to a wording, the information element 36 can be colors, signs, letters, numbers, etc. Further, next to signaling to the outside a property of the cartridge fuse, i.e. blown or not blown, the signaling device 24 can signal further properties, e.g. a voltage, current, temperature, etc. The transmission layer 32 is covered from the above by means of the above-mentioned top glass 30, such to protect the transmission layer 32 against environmental influences, e.g. water, moisture, vandalism, etc. The top glass 30 is connected or rather adhered to the substrate 28 by means of a sealing layer 37 disposed beneath the top glass 30 in a periphery thereof. The opposing surfaces of the sealing layer 37 can comprise adhesive, such that the sealing layer 37 further acts as an adhesive layer. In doing so, e.g. an interior of the substrate 28 in a region beneath the transmission layer 32 is proper sealed against the environment.

FIGS. 3*a-e* schematically depict exemplary circuits of the signaling device 24.

Figure 7:
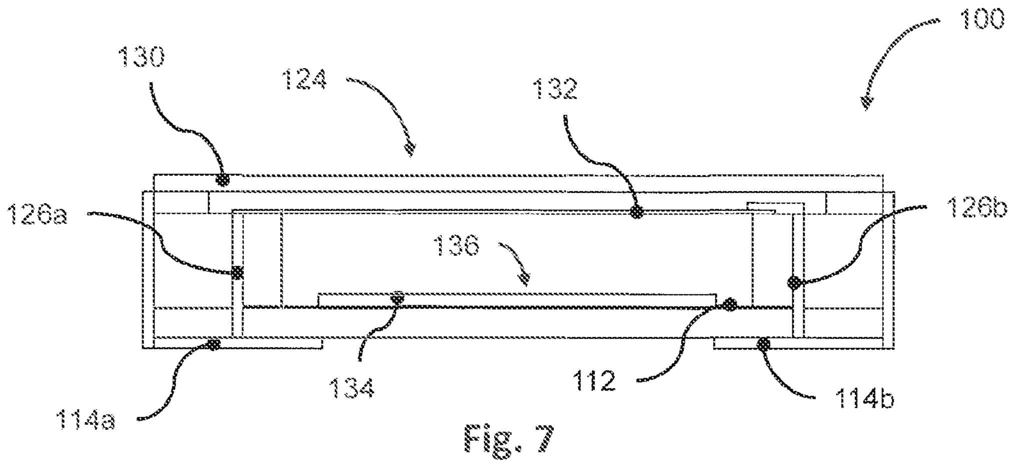
FIG. 7 shows an electrical fuse apparatus in a further embodiment.

FIG. 3*a* shows the signaling device 24 in a simplified schematic status indication for e.g. <=48V. The signaling device 24 can comprise the cartridge fuse 12 and the transmission layer 32 connected to each other in parallel. Of course, a fuse element different from the cartridge fuse 12 can be used, as shown in FIG. 7.

Figure 3B:
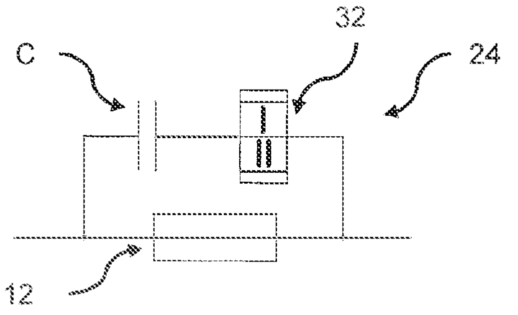

FIG. 3*b* shows the signaling device 24 in a simplified schematic status indication for e.g. up to 250 V. In this aspect, the signaling device 24 comprises the cartridge fuse 12, the transmission layer 32 and a capacity (capacitor) C. The transmission layer 32 and capacity C can be connected in series, while the series connection of the transmission layer 32 and capacity C can be connected to the cartridge fuse 12 in parallel. Of course, in both aspects, instead of the cartridge fuse as shown in FIG. 1, a fuse element different from said cartridge fuse can be used.

Figure 3C:
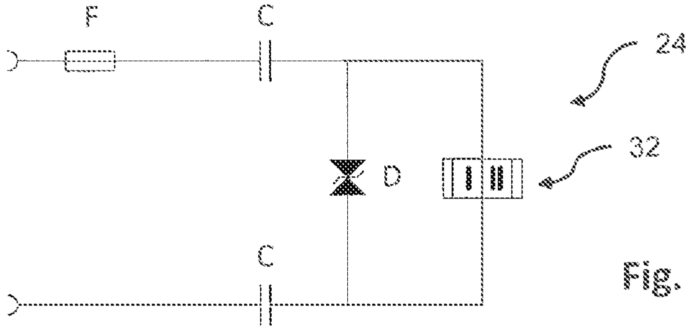
Figure 3D:
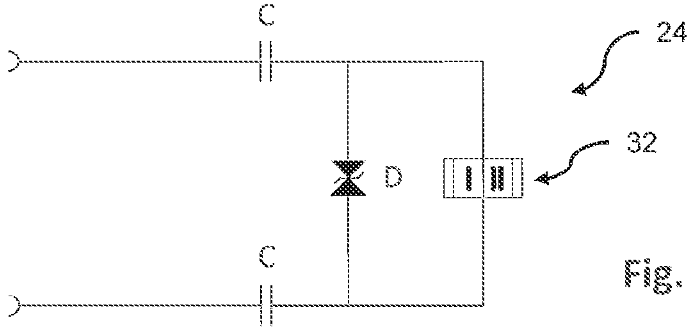
Figure 3E:
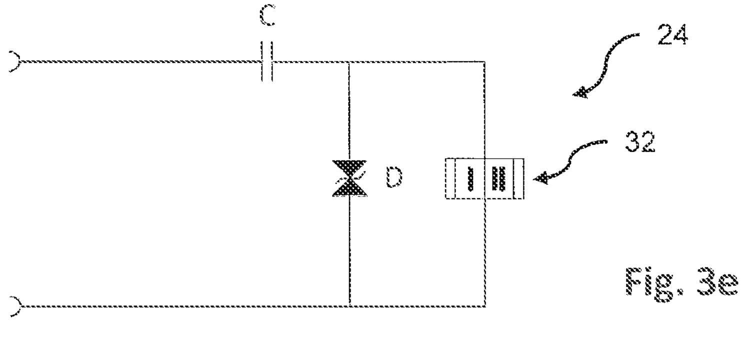

Further variants of the signaling device 24 are shown in FIGS. 3*c-e*, wherein FIG. 3*c* shows a schematic with highest safety requirement, FIG. 3*d* shows a standard schematic, and FIG. 3*e* shows a schematic of a low-cost version with reduced safety requirement. In the depicted variants, a suppressor diode D can be connected to the transmission layer 32 in parallel. Further, at least one capacitor C can be connected in series. In the variant achieving highest safety requirement, the signaling device 24 can be equipped with a fuse F (refer to FIG. 3*c*).

Figure 4A:
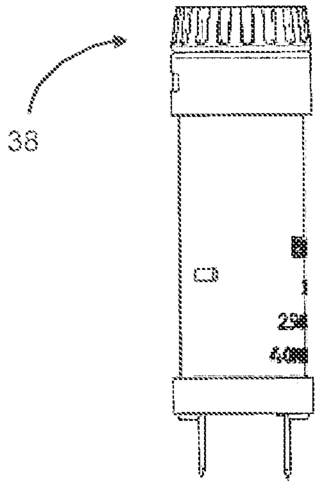
FIGS. 4*a,b* different views of an electrical fuse apparatus having a cylindrical body in an embodiment.
Figure 4B:
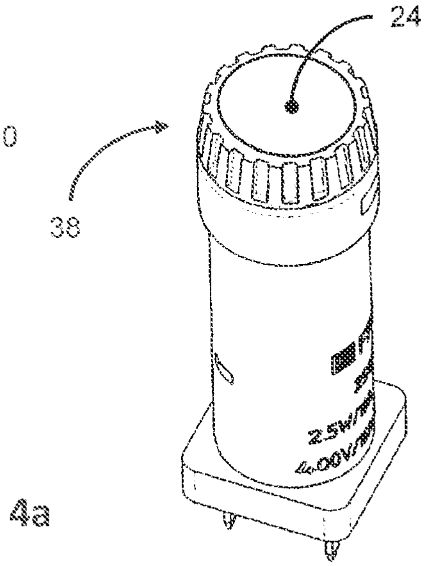

FIGS. 4*a,b* and 5 depict electrical fuse apparatuses 10 having essentially cylindrical bodies in different examples. FIGS. 4*a,b* show an electrical fuse apparatus 10 in an example in a side view and a perspective view, respectively. Said fuse apparatus 10 can be mounted in vertical orientation, allowing to safe mounting space on e.g. a PCB (not shown). The electrical fuse apparatus 10 can be equipped with a cartridge fuse (not shown) by simply removing a cap 38 fixed on the top, e.g. by means of unscrewing the cap 38, and then inserting the cartridge fuse from above. The thus equipped electrical fuse apparatus 10 can be closed again by screwing the cap 38.

Figure 5:
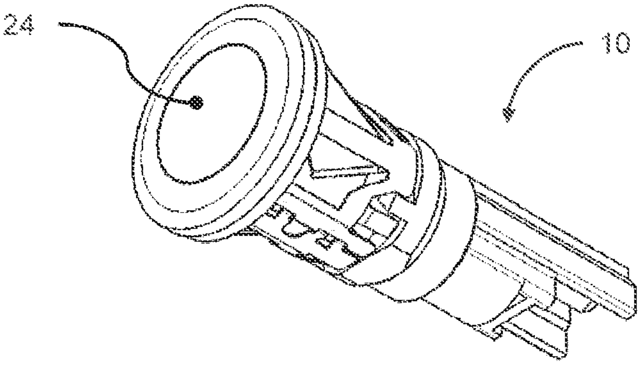
FIG. 5 depicts a further embodiment of an electrical fuse apparatus in a perspective view.

FIG. 5 depicts an electrical fuse apparatus 10 having a cylindrical body in a further example in a perspective view. The shown electrical fuse apparatus 10 is adapted to be mounted in the housing of an electric appliance, e.g. a power supply unit. In the shown exemplary electrical fuse apparatuses 10, the top surfaces of the respective caps 38 are provided with the signaling device 24, which allows to signal to the outside the property of the inserted cartridge fuse.

Figure 6A:
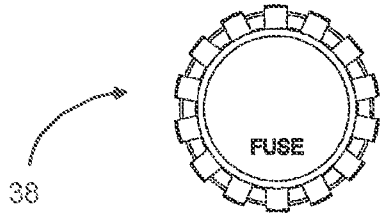
FIGS. 6*a-c* show a cap in different views.
Figure 6B:
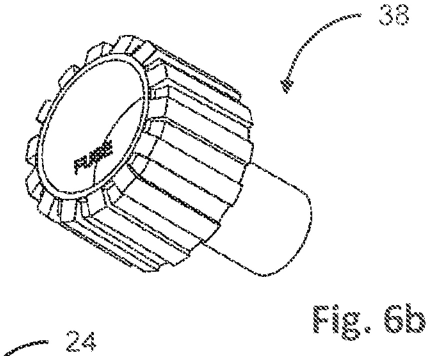
Figure 6C:
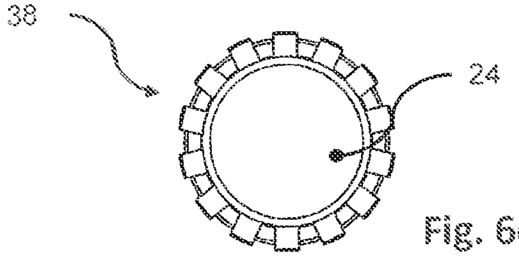

FIGS. 6*a-c* show an exemplary cap 38 in different views, respectively. As shown, the outer periphery of the cap 38 can be knurled in order to allow screwing or unscrewing the cap 38 by hand. The top surface of the cap 38 is provided with the signaling device 24, which allows to signal to the outside the property of the inserted cartridge fuse. In a non-shown example, the top of the cap 38 can be provided with a slot allowing to be engaged by a tool, e.g. by a screwdriver (not shown), in order to allow screwing or unscrewing the cap solely by means of a tool.

The FIG. 7 shows an electrical fuse apparatus 100 in a further embodiment. The electrical fuse apparatus 100 comprises a fuse element 112 and a signaling device 124 formed integrally. The electrical fuse apparatus 100 can be supported by means of conductive terminals 114*a,b*, which can be coupled to conductive paths provided on a PCB, e.g. by means of soldering or might be coupled to conductive paths provided by a fuse clip. The signaling device 124 comprises a top glass 130 and a transmission layer 132 having an electrically controllable transmission factor. Conductive terminals of both the fuse element 112 and the signaling device 124 are connected to the terminals 114*a,b* in parallel by means of conductive leads 126*a,b*, e.g. vias, filled vias, holes, etc., respectively. Hence, essentially equal electric potentials are applied to both the fuse element 112 and signaling device 124, respectively. The electrical fuse apparatus 100 is further equipped with a signaling layer 134 which is visible to the outside once the transmission layer 132 is controlled to be transparent and is invisible from the outside once the transmission layer 132 is controlled to be opaque. This allows to signal to the outside the property of the fuse element 112. The transmission layer 132 can be disposed beneath the top glass 130 such to be protected against the environment.

Figure 8A:
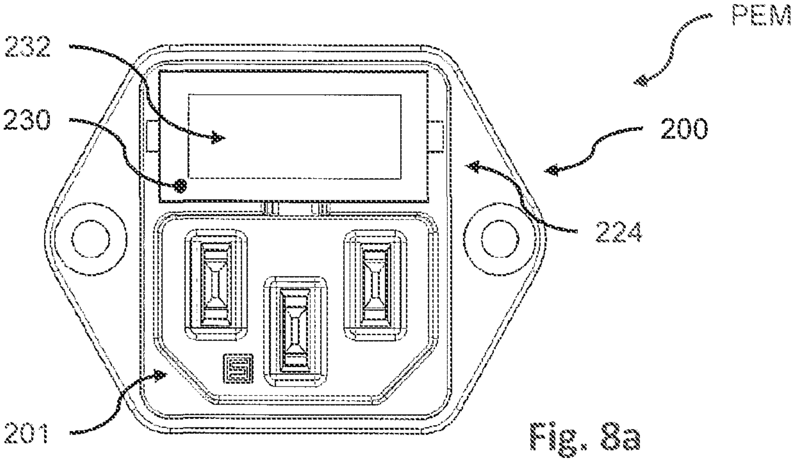
FIGS. 8*a,b* show exemplary electrical fuse apparatuses integrated in an appliance inlet or power entry module in a front view, respectively.
Figure 8B:
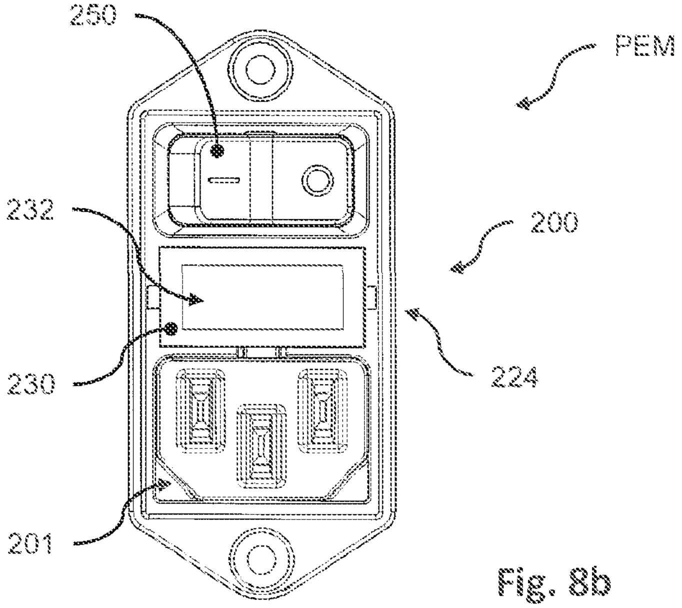

FIGS. 8*a,b* show exemplary appliance inlets or rather power entry modules PEM in front views, respectively. The power entry modules PEM comprise connectors 201, each adapted to receive a corresponding connector of a power cord (not shown). Further comprised is an integrated electrical fuse apparatus 200 equipped with an integrated fuse holder for cartridge fuses (both not shown). The power entry modules PEM are for suppling a device (not shown) with power, e.g. AC power. The power entry module PEM shown in FIG. 8*b* is further provided with a power switch 250.

At least one phase of the power supply can be protected against e.g. over current by means of the integrated electrical fuse apparatus 200 (not shown). Further provided is a signaling device 224, which is configured to signal to the outside at least one property of the inserted fuse element. Said signaling device 224 comprises a top glass 230, wherein one surface thereof is exposed to the outside. Further comprised is a transmission layer 232 having a controllable transmission factor. The transmission layer 232 is arranged such to be protected against the environment by means of the top glass 230. The signaling of the at least one property of the inserted fuse element is achieved by controlling the transmission layer 232 to be transparent or to be opaque. The FIGS. 8*a,b* show the transmission layer 232 opaque, which signals to the outside that the fuse element is not blown. While not shown, in case of the transmission layer 232 is shifted to be transparent, this would signal to the outside that the cartridge fuse is blown. Therefore, the operator is able to easily recognize the respective property of the cartridge fuse, i.e. blown or not blown.

The invention claimed is:

1. A signaling device configured to be electrically coupled to an electric potential applied to terminals of a fuse element or to clips of a fuse holder, wherein said signaling device is configured to signal to outside of the signaling device at least one property of said fuse element, wherein said signaling device comprises:

at least one transmission layer having an electrically controllable transmission factor;

a transparent rigid top cover positioned apart from the transmission layer and covering the transmission layer; and a substrate provided with electrical terminals being electrically connected with terminals of the transmission layer, and being connectable with the terminals of the fuse element or the clips of the fuse holder; and wherein the signaling device comprises a suppressor diode connected in parallel to the transmission layer, and further comprises at least one capacitor connected in series to the transmission layer and the suppressor diode.

2. The signaling device according to claim 1, further comprising leads configured to connect the transmission layer and the fuse element in parallel.

3. The signaling device according to claim 2, wherein the leads comprise conductive rubber leads configured to provide an electrical connection between terminals of the transmission layer and the terminals of the fuse element or between terminals of the transmission layer and the clips of the fuse holder, respectively.

4. The signaling device according to claim 1, wherein the transmission layer is configured to control its transmission factor in relation to an electric potential applied to terminals of the transmission layer.

5. The signaling device according to claim 1, wherein the transmission layer comprises liquid crystals configured to be aligned in an electrical field.

6. The signaling device according to claim 1, wherein the transmission layer comprises a Polymer Dispersed Liquid Crystal, PDLC, layer.

7. The signaling device according to claim 1, further comprising a signaling layer arranged behind the transmission layer if viewed from the outside.

8. The signaling device according to claim 7, wherein the signaling layer comprises an information element configured to signal to the outside the at least one property of the fuse element.

9. The signaling device according to claim 8, wherein said information element is labeled and/or printed onto a surface of the signaling layer facing the transmission layer.

10. The signaling device according to claim 8, wherein said information element comprises at least one of color(s), sign(s), letter(s), wording(s), and numb er(s).

11. The signaling device according to claim 1, wherein the property of the fuse element comprises at least one of a conductive state or blocking state of said fuse element, a voltage, a current, and a temperature.

12. The signaling device according to claim 1, wherein the transmission factor of the transmission layer is controlled in a range between opaque and transparent.

13. The signaling device according to claim 12, wherein the signaling device is configured to control the transmission factor of the transmission layer to be transparent when the fuse element is in a blocking state, or to be opaque when the fuse element is in a conductive state.

14. An electrical fuse apparatus comprising a fuse element, a base for supporting the fuse element, and a signaling device according to claim 1, wherein said signaling device is electrically coupled to an electric potential applied to the fuse element.

15. A device comprising at least one electrical component and an electrical fuse apparatus according to claim 14, wherein said electrical fuse apparatus is configured to protect the electrical component against over-current.

16. A power entry module (PEM) adapted to supply an electrical appliance with power, said power entry module (PEM) comprising the electrical fuse apparatus according to claim 14.

* * * * *